March 24, 1970   D. A. BURNS   3,502,412
METHOD AND APPARATUS FOR MEASURING OSMOTIC FRAGILITY OF
RED BLOOD CELLS BY CONSTANTLY REDUCING THE
CONCENTRATION OF THE SALINE SOLUTION
SUSPENDING THE CELLS
Filed Oct. 16, 1967   5 Sheets-Sheet 1

\* controlled through
the OFF/STANDBY
switch

Inventor
Donald A. Burns
By Gildo E. Fato
Attorney

March 24, 1970     D. A. BURNS     3,502,412
METHOD AND APPARATUS FOR MEASURING OSMOTIC FRAGILITY OF
RED BLOOD CELLS BY CONSTANTLY REDUCING THE
CONCENTRATION OF THE SALINE SOLUTION
SUSPENDING THE CELLS Filed Oct. 16, 1967     5 Sheets-Sheet 4

Inventor
Donald A. Burns
By Gildo E. Fato
Attorney

Fig.8

United States Patent Office 3,502,412
Patented Mar. 24, 1970

3,502,412
METHOD AND APPARATUS FOR MEASURING OSMOTIC FRAGILITY OF RED BLOOD CELLS BY CONSTANTLY REDUCING THE CONCENTRATION OF THE SALINE SOLUTION SUSPENDING THE CELLS
Donald A. Burns, Kenosha, Wis., assignor to Abbott Laboratories, North Chicago, Ill., a corporation of Illinois
Filed Oct. 16, 1967, Ser. No. 675,414
Int. Cl. G01n 33/16
U.S. Cl. 356—40       8 Claims

ABSTRACT OF THE DISCLOSURE

A method for automatically determining the osmotic fragility of red blood cells by continually admixing a stream of red blood cells with a stream of saline solution gradient of continually changing salt concentration to produce a suspension of the cells in the gradient and then measuring the light transmission through the suspension to determine the osmotic fragility. At the same time that red blood cells are being added to the stream of saline solution ensuing from a mixing vessel, the salt concentration of the saline solution in the mixing vessel is continually being decreased by withdrawing solution while simultaneously adding water. By varying the rate of saline solution withdrawal in comparison to water addition, a preselected salt gradient may be maintained.

BACKGROUND OF THE INVENTION

When red blood cells are suspended in an isotonic saline solution, their shape remains unchanged. However, when they are suspended in a saline solution of continually decreasing salt concentration, the red blood cells gradually assume a spherical shape and eventually burst, releasing the soluble red pigment hemoglobin and turning into transparent "ghosts." This is known as hemolysis, which is the release of the red cell hemoglobin into the suspending medium and results from the osmotic pressure developed inside the membrane of the red cell. Osmotic fragility has been proposed by Danon et al., Transfusion, 4, 339, (1964), as a routine test in blood banks, and Valerie et al., Transfusion, 5, 267 (1965), have demonstrated a relationship between osmotic fragility and in vivo survival of blood. Thus, the "state of health" of red blood cells can be determined bp observing their osmotic fragility. Originally, this test was conducted by employing a series of test tubes, each containing the same volume of a salt solution of progressively lower concentration into which the same amount of red blood cells is introduced. The hemolysis which occurred in each test tube was then observed. Danon, in the Journal of Clinical Pathology, 16, 377 (1963), disclosed a test in which the reduction of salt concentration was obtained by dialyzing a given volume of blood suspension in isotonic saline against distilled water. In Danon's test, a specific dilution of whole blood in isotonic salt solution is introduced into a cell, two walls of which are made of a dialyzing membrane. The container cell is then introduced into a transparent container having parallel walls and filled with distilled water, which is then placed in an instrument which is essentially a colorimeter with a recorder. The measurement of the degree of hemolysis which occurs is based on the increasing transparency of the suspension while hemolysis takes place. This increased light transmission is recorded as a function of time.

SUMMARY OF THE INVENTION

The apparatus employed in conducting the method of the present invention contains four basic groups of components: (a) the necessary plumbing to create the desired saline solution gradient; (b) an electronic circuit to compute the derivative of the cumulative curve, if desired; (c) a programmer to automatically and sequentially prepare a fresh gradient for each sample of whole blood; and (d) electrical connections for a colorimeter, one or two recording channels, a sampler, proportioning pump, and hydraulic connections, as hereinafter explained.

Figure 5:
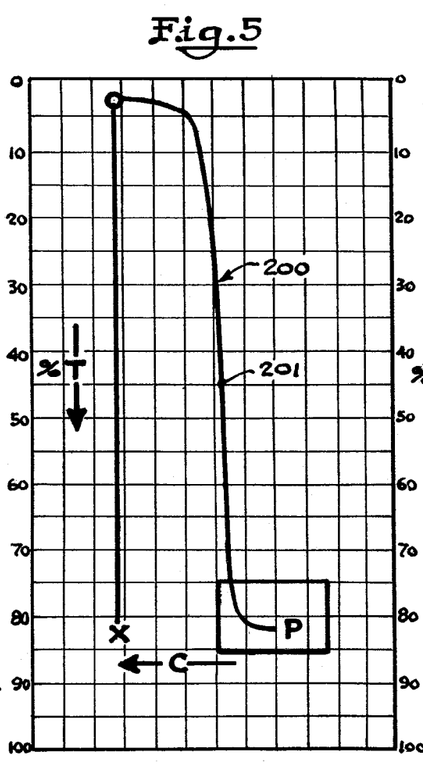
FIGURE 5 is a plot of percent transmission through the red blood cell suspension versus salt concentration of the saline solution gradient stream.

A saline solution gradient stream of continually decreasing salt concentration is provided into which the red blood cells are mixed. By determining the light transmission of the red blood cell suspension, the degree of hemolysis taking place can be measured. In the embodiment described hereinafter, the blood is diluted in a 25:1 ratio with the saline solution gradient stream. The initial concentration of the saline solution gradient is preselected at 0.8% salt so that the suspended red blood cells flowing through the colorimeter present a nearly opaque stream. As the salt concentration of the gradient stream approaches 0.4%, the number of intact red blood cells rapidly decreases and the stream becomes more transparent to red light (600 m$\mu$). At still lower salt concentrations, most of the red cells rupture and the light transmission approaches a steady state. A plot of percent transmission through the red blood cell suspension versus the salt concentration of the saline solution gradient stream results in a curve 200 as illustrated in FIGURE 5. The inflection point 201 of such a curve represents the point of maximum rate of hemolysis of the red blood cells. As hereinafter to be explained, this point can be located with far greater precision by preparation and examination of a derivative curve.

By providing a saline solution gradient stream of continually decreasing salt concentration into which the red blood cells are introduced, the present method permits a particular cell to experience only a single salt concentration. This is in contrast to prior methods in which any given cell has a "past history" of a continually decreasing tonicity since each cell is subjected to the full range of salt concentration. In the present method there is no "past history" effect since any given cell is subjected only to a single salt concentration which it experiences at the point of first mixing with the saline solution gradient stream. This permits studies to determine the effect of other substances upon the osmotic fragility of red blood cells, which is not possible with prior methods. For example, the effect of saponin, or other substance, on cell hemolysis can be determined by pumping blood continuously at 0.10 ml. per minute from a stirred vessel instead of from the sampling device and pumping saponin, or other test substance, at the same rate from the sampler. Both enter the gradient stream at the same point so that the effect of the substance on cell hemolysis can be determined. In conjunction with a sampler, the method also permits the determination of the osmotic fragility of a series of blood samples, the determinations being made automatically and sequentially.

DETAILED DESCRIPTION

The practice of the method and apparatus used in practicing the method, together with advantages thereof, will be better understood upon consideration of the following description with reference to the following drawings, in which.

Figure 1:
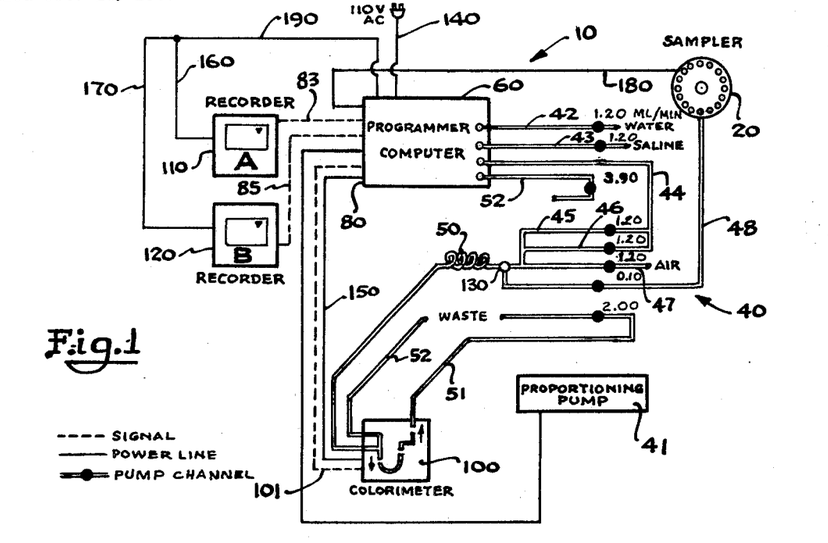
FIGURE 1 is a schematic diagram of the arrangement of the apparatus and the flow of the fluids whereby the method of the invention may be practiced.

As shown in FIGURE 1, a suitable apparatus 10 for determining the osmotic fragility of red blood cells in accordance with the method of the present invention comprises a sampler 20 in which samples of blood to be tested are placed and are subsequently fed sequentially to be mixed with the saline solution gradient stream and then passed through a colorimeter 100 where the transmission of the red blood cell suspension is measured; a saline solution concentration gradient preparation system 40, shown in greater detail in FIGURE 4 and hereinafter to be described in detail, generally comprises a pump 41 and attendant tubing 42-52 which is selected in appropriate respective sizes to maintain the desired flow ratio between Water-in and Gradient-out; a programmer 60 shown in greater detail in FIGURE 3 and hereinafter to be described in detail, which controls the valves for saline solution gradient preparation, a starting line on the recording, the mode of operation, and maintains synchronization with the sampler; a computer 80 which receives the signal from the colorimeter; and two recorders 110 and 120. If a simple cumulative curve is desired, the signal 101 from the colorimeter 100 is directed by the computer circuit 80 to a first recorder 110. If both a cumulative and derivative curve is desired, the computer 80 will compute the derivative signal and feed it to a second recorder 120. If desired, a single two-pen recorder may be employed. In the embodiment to be hereinafter described, standard modules such as the sampler, programmer, colorimeter, and recorders, manufactured by the Technicon Corporation for use with their AutoAnalyzer equipment, were employed.

In use, a blood sample stored in sampler 20 is mixed and then fed through tubing 48 to a juncture 130 with saline solution gradient which is prepared by the gradient preparation system 40. In the gradient preparation system 40, saline solution of the highest concentration to be employed, generally about 0.8% to 0.9% salt, is fed through tubing 43 into a mixing vessel 55. Water is simultaneously fed through a separate tube 42 into the mixing vessel 55 to be mixed with the saline solution. The resulting gradient is withdrawn through tubing 44 and vents through tubing 45 and 46 into the juncture 130 with red blood cells. By appropriate selection of the sizes of the tubing through which the water is fed in and the saline solution gradient stream is withdrawn, an appropriate gradient is maintained, whereby the salt concentration of the saline solution is continuously decreased. The total of the original amount of saline solution placed in the mixing vessel 55 and the water added thereto for each cycle must slightly exceed the amount of gradient withdrawn per cycle, otherwise the cycle will be limited to a small concentration change. In the described embodiment, 10 ml. of the original saline solution is placed in the mixing vessel, 9 ml. of water is added per cycle, and 18 ml. of gradient is withdrawn. While precise amounts are not critical, the respective flow rates of the Water-in and Gradient-out must be selected and maintained in order to produce the desired concentration gradient. After the red blood cells and saline solution gradient stream are mixed at the juncture 130 of the respective tubing, the resultant suspension is further mixed in a coil 50, which also delays the combined stream a suitable length of time to permit the required degree of hemolysis, and then fed through a single tubing 49 into the colorimeter 100 where the light transmission of the suspension is measured. If desired, small amounts of air may be introduced into the gradient stream by means of a separate line 47 to aid in maintaining sample integrity. Otherwise, some undesirable mixing may occur since fluid along the walls of a tube tends to travel at a different rate than the fluid in the center of the tube. After the sample is measured, it is withdrawn through a waste tubing 51. The programmer-computer is connected to an outside power source through a single electrical connection 140. All of the other components of the apparatus receive their power through internal connections 150, 160, 170, 180, 190 in the programmer-computer so that after the desired number of samples are fed through the sampler 20, measured, and recorded, the programmer 60 will automatically turn off all of the components.

SALINE CONCENTRATION GRADIENT PREPARATION SYSTEM

Figure 4:
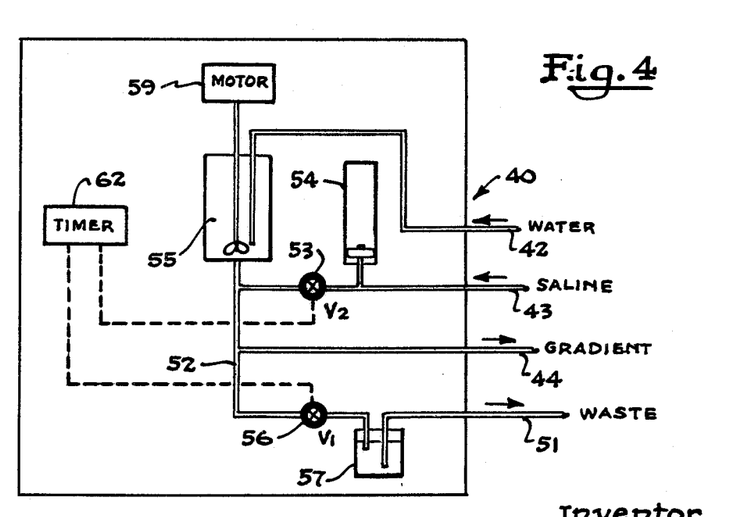
FIGURE 4 is a schematic diagram in detail of the saline solution concentration gradient preparation device.

Referring to FIGURES 1 and 4, the operation of the saline solution concentration gradient preparation system 40 will be described. The purpose of this system is to produce a continually decreasing salt concentration gradient stream into which the blood sample is pumped so that over a period of 7½ minutes the salt solution into which the blood flows approaches zero salt concentration. For purposes of the described embodiment, a time period of 7½ minutes was chosen, although other time cycles may be selected as desired. The salt concentration at any given time ($C_L$) can be computed from the equation $$C_L = C_0 \left( \frac{TR_3 - t(R_1 - R_2)}{TR_3} \right)^{2R_2/R_1}$$

wherein $C_0$ is the original concentration, $T$ is the time of the cycle, $t$ is the elapsed time, $R_1$ is the rate of Mixture-out, $R_2$ is the rate of Water-in, and $R_3$ is the rate of Salt-in.

One way of preparing a concentration gradient, and which is the method employed herein, is to allow a first liquid of one concentration to flow into a second liquid of a different concentration while mixing the latter and removing the admixture which may be termed the gradient. Bock et al., in Analytical Chemistry, 26, 1543 (1954), describes the gradients obtained from vessels of different cross-sectional areas from which liquids flow at different rates, and this publication may be referred to for mathematical details. To summarize, if the flow rate of a mixture out of a container is twice the flow rate of water in, then the gradient will be linear. If the ratio is greater than 2, the gradient will be convex; if less than 2 the gradient will be concave. If the ratio is precisely 1, then the gradient will be logarithmic and a gradient of log concentration versus time will be linear. For ease in correlating inflection points with saline concentration for purposes of the present invention, it is desirable to have a linear gradient of salt concentration. It is therefore important that the rate of gradient out be precisely twice that of water in. One method of accomplishing this is to employ conduit such as tubing of the same nominal size, since two of these in parallel will pump substantially twice the rate of the remaining one. Thus, one tube is used to pump water in and two are used to withdraw gradient. Apparatus for accomplishing this result is illustrated in FIGURE 4. A preselected amount of saline solution of the highest concentration to be employed, generally 0.8%–0.9% salt, is pumped through tubing 43 from a reservoir (not shown) and subsequently mixed with water. When the valve 53 is closed, the saline solution will be pumped into a 25 cubic centimeter (cc.) storage tube 54 against a head of air. When the solenoid valve 53 is opened for a few seconds, the saline solution stored in the tube 54 will be quickly forced into a 10 cc. mixing vessel 55. Just prior to this operation, however, the second solenoid valve 56 opens for a few seconds to completely drain the mixing vessel 55 of solution from the previous sample. The resultant salt solution gradient stream is withdrawn through tubing 44. The addition of water to the saline solution in the mixing vessel 55 at a rate less than at which the mixture is being withdrawn results in the gradient stream to which the red blood cells are added. While gradient is being withdrawn and both valves are closed, the waste container 57 is being evacuated so that as soon as the valve 56 is opened, the remaining solution from the mixing container 55 will be drawn to the waste container 57; and after the valve 56 is closed, the waste solution will be withdrawn through tubing 51. A suitable mixing device 59 is used to mix the saline solution and water. Referring to FIGURE 1, it can be seen that water is being pumped into the mixing container 55 through the tubing 42 at a rate of 1.2 ml. per minute. Since two tubes, 45 and 46, of the same size as used to introduce water are used to withdraw gradient, gradient will be withdrawn at the rate of 2.4 ml. per minute, which produces the desired linear gradient. The linearity can be checked by passing potassium dichromate or any substance which obeys Beer's law into the Saline-in tubing 43 and monitoring the absorbance of the gradient being withdrawn through the tubing 44 at the correct wave length on a linearized recorder. The recorder is then synchronized to obtain the same number of vertical lines as the number of values of saline concentration to be employed. It is desirable that these values range from 0.8% to 0.3% of salt in units of 0.1%, although for some purposes the range of 0.7% to 0.2% is more appropriate. Water is then pumped continuously into both inputs, the Water-in tubing 42 and the Saline-in tubing 43 and monitoring the absorbance of the gradient being The potassium dichromate or other substance which obeys Beer's law is then pumped into the Saline-in tubing 43 until at least one cycle of gradient is obtained. Finally, the same substance is pumped into both inputs, Water-in and Saline-in, until a steady state (A) is obtained. Since the gradient has been defined as linear, the data must therefore fit the equation of a straight line, $y = mx + b$, where $x$ any $y$ are taken from the data (transmission and concentration, respectively) and $m$, the slope of the line, and $b$, the $y$ intercept, are evaluated. With reference to the curve produced by the substance, if D is the initial concentration of interest (0.8% saline) and E the final concentration of interest (0.3% saline), and if OD is the optical density at the steady state A, and further if the point at which the curve intersects the initial concentration D is defined as B, and if the point at which the curve intersects the final concentration E is defined as C, then $$m = \frac{B-C}{D-E}$$

and $b = C - mE$. Therefore, $$C_{MAX.} = \frac{A-b}{m}$$

and $$C_{MIN.} = -\frac{b}{m}$$

For a value of E of 0.2% salt and the respective flow rates specified hereinabove, $C_{MIN}$ may be so close to zero that water is satisfactory as the diluting fluid. If $C_{MIN}$ should be negative, then the Saline-in tubing 43 size should be decreased.

COMPUTER MODULE

Figure 2:
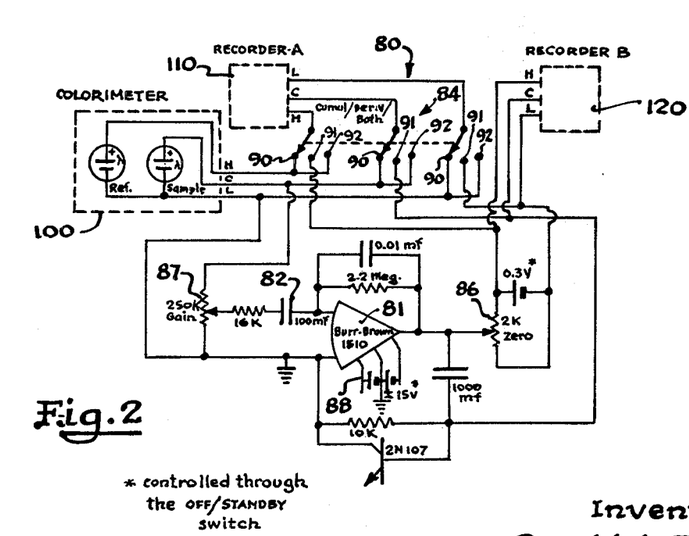
FIGURE 2 is a circuit diagram in detail of that portion of the programmer- computer utilized to compute the derivative of the cumulative curve.

The computer 80 circuit illustrated in FIGURE 2 was designed around a Burr-Brown Model 1510 operational amplifier 81 and employs standard circuitry. While derivatives of rapidly-changing signals are relatively easy to compute, in the instant apparatus and method, two or three minutes are required for the signal to change by only a few millivolts; and therefore particular components will become fairly critical. The 100 microfarad input capacitor 82, for example, should be a computer grade or other high-quality component, since capacitors of lesser quality may result in an unacceptable signal-to-noise ratio. Referring to FIGURES 1 and 2, the unchanged colorimeter signal 83 (FIGURE 1) resulting from measurement of a sample is directed to a first recorder 110 when the switch 84 is in the position CUMULATIVE 90 or CUMULATIVE/DERIVATIVE 92. The recorder 110 will receive the derivative signal 85 (FIGURE 1) when the switch 84 is in the DERIVATIVE 91 position. The second recorder 120 is not intended to be used unless both curves are desired, and receives only the derivative signal 85. The position and size of the derivative curve are controlled by the ZERO 86 and GAIN 87 controls, respectively. An OFF/STANDBY switch (not shown) controls the double power supply 88, permitting the required warm-up period of the operational amplifier 81, and also makes power available to the programmer 60 and other modules.

PROGRAMMING MODULE

Figure 3:
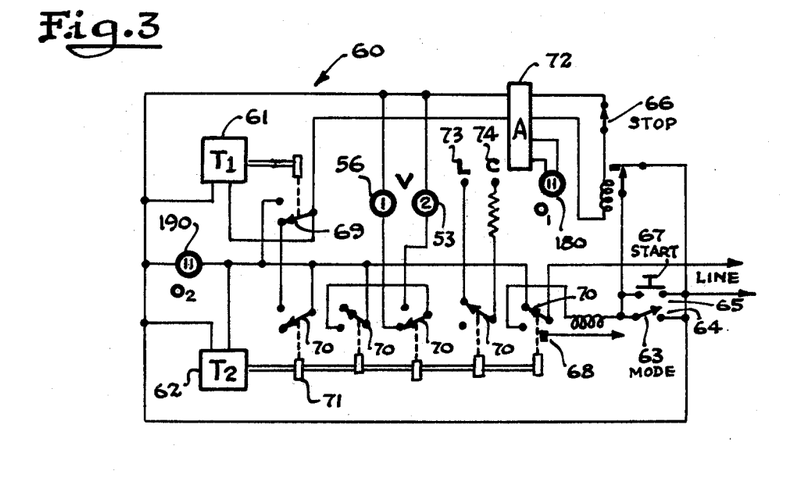
FIGURE 3 is a circuit diagram in detail of the programmer portion of the apparatus.

The programmer 60 illustrated in FIGURE 3 is wired around two timers, 61, 62. One timer 62 operates on a 7½-minute cycle and controls the valves 53, 56 for gradient preparation, the starting line on the recording, and the mode of operation; the other timer 61 operates on a one-minute cycle and maintains synchronization with the sampler 20. When the MODE switch 63 is on the CONTINUOUS or CLOSED setting 64, the timers 61, 62 will keep recycling. When the switch 63 is on the NORMAL or OPEN setting 65, the timers 61, 62 will shut off all of the modules either with the last sample or at the end of the next cycle, depending on the position of the STOP switch 66, i.e., when the STOP switch 66 is in the CLOSED position, the modules will turn off with the last sample, and when it is in the OPEN position, the modules will turn off at the end of the next cycle. The START button 67 momentarily activates the magnet on the locking cam 68, permitting one cycle, during which time the mode of operation and method of stopping may be set as desired.

The reference numerals in FIGURE 3 signify the following: $T_1$=timer 61, 1-minute cycle, 1 cam-operated single-pole-double-throw switch 69; $T_2$=timer 62, 7½-minute cycle, 5 cam-operated single-pole-double-throw switches 70, 1 locking 71; $V_1$=valve 56, solenoid, for emptying gradient mixing chamber 55; $V_2$=valve 53, solenoid, for filling gradient mixing chamber 55; $S_1$=switch 63; single-pole-single-throw, labeled MODE; $S_2$=switch 66, single-pole-single-throw, labeled STOP; $S_3$=switch 67, push-button normally-open, labeled STAR; $O_1$=outlet 180 for sampler 20; $O_2$=outlet 190 for all other modules; $A_2$=automatic record changer/amplifier shut-off module 72.

SYNCHRONIZATION

In the embodiment described and illustrated, the gears in the recorder and timers were selected to provide 3 inches of chart paper for each sample. With lines on the chart paper at ½-inch intervals, six lines are provided for each cycle; and therefore six half-inch spaces for each sample. It is convenient to have the linear gradient occur during five of these spaces with the remaining space devoted to the changeover between both gradient and sample. Since the recorder, the sampler, and the timers all have synchronous motors, synchronization, once established, will continue until any of these units is electrically disconnected.

To establish synchronization, the point representing the maximum concentration of gradient (generally 0.8% salt) is made to fall on the first of the six lines of the chart paper. After the chart has been so adjusted, the recorder should not be turned off again except by means of the programmer-computer module. In this fashion, the gradient and recorder are placed in synchronization.

The sampler 20 is then synchronized with the recorder and gradient as follows: Since valve $V_1$ 56 is open longer than is necessary to completely remove the unused saline solution from a previous cycle, a small bubble of air is drawn into the Gradient-out line 44. This serves two purposes: (a) it removes any settled red blood cells from the flow cell as it passes through, and (b) it provides a visual indication on the recorded trace of where one gradient cycle ends and the next one begins. With the sampler 20 set for 60 samples per hour, or one minute per sample, and since one-third of this time is normally used as a wash period, 20 seconds represents the time in which no sample is flowing. The cam 71 on the first timer 62 which controls the second timer 61 is then adjusted so that the air bubble between two gradient cycles and the air space between two samples reach the point where these two streams join, at the same time.

When the air bubble flows through the flow cell of the colorimeter 100, the effect is a "spike" on the recording trace. As a matter of appearance, this can be eliminated by shorting the L and C leads 73, 74 (FIGURE 3) from the colorimeter 100 through a 150-ohm resistor (not shown). When these leads are shorted, the recorder pen will move down scale. The sequence of events when all modules are correctly synchronized is given in the following table.

| Event: | Time (minutes:seconds) |
|---|---|
| Start (sampler 20 in WASH position) | 0:00 |
| Sampler 20 moves to SAMPLE position | 0:30 |
| Timer $T_1$ 61 off, sampler 20 off (still sampling) | 1:30 |
| Valve $V_1$ 56 open, empty gradient chamber 55 | 3:00 |
| Valve $V_1$ 56 closed, valve $V_2$ 53 on, refill mixing chamber 55 | 3:05 |
| Valve $V_2$ 53 closed | 3:10 |
| New sample joins new gradient stream | 4:00 |
| Last calibrated line on chart paper | 6:00 |
| L–C, 73, 74 shorted, recorder pen moves down scale | 6:15 |
| End of sample in flow cell (colorimeter) | 6:25 |
| Air bubble in flow cell (colorimeter) | 6:35 |
| New sample in flow cell (colorimeter) | 6:45 |
| L–C, 73, 74 unshorted, pen assumes new plateau | 7:00 |
| First calibrated line on chart paper | 7:15 |
| Entire cycle repeats | 7:30 |

Figure 6:
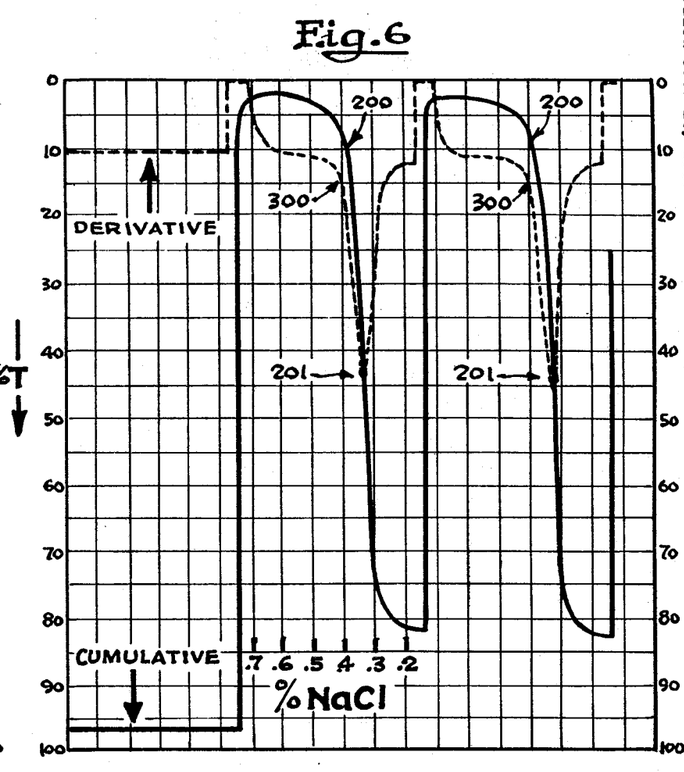
FIGURE 6 is a plot of two sets of cumulative and derivative curves.

As previously described, a plot of percent transmission of the red blood cell suspension versus the salt concentration of the saline solution gradient produces a cumulative curve 200 as illustrated in FIGURE 5. Examination of this curve illustrates the difficulty in determining precisely where the inflection point 201 of the curve occurs. The inflection point 201, i.e., the point of maximum rate of hemolysis, can be located with far greater precision by examination of the derivative curve 300 (FIGURE 6), since the position on the salt concentration or time axis of the peak of the derivative curve coincides with that of the inflection point 201. As illustrated, the inflection point 201 of the cumulative curve 200 coincides with the peak of the derivative curve 300, although this is not always the case. Referring to FIGURE 6, two sets of cumulative 200 and derivative curves 300 are shown, the solid lines representing the cumulative curves and the broken lines their derivatives plotted simultaneously with a two-pen recorder. In this particular example, synchronization and proper scaling resulted in the six vertical lines representing a saline solution concentration gradient of 0.7% through 0.2% salt concentration in intervals of 0.1%. The point of maximum rate of hemolysis 201 occurs in each case at 0.34% salt concentration. The percent transmission of the red blood cell suspension at various salt concentrations as plotted on these curves is shown in the following table.

VARIATION OF PERCENT TRANSMISSION WITH SALINE CONCENTRATION

| Saline concentration (percent) | Percent transmission |
|---|---|
| 0.7 | 2.0 |
| 0.6 | 2.2 |
| 0.5 | 3.2 |
| 0.4 | 7.8 |
| 0.3 | 72.0 |
| 0.2 | 82.0 |

Figure 7:
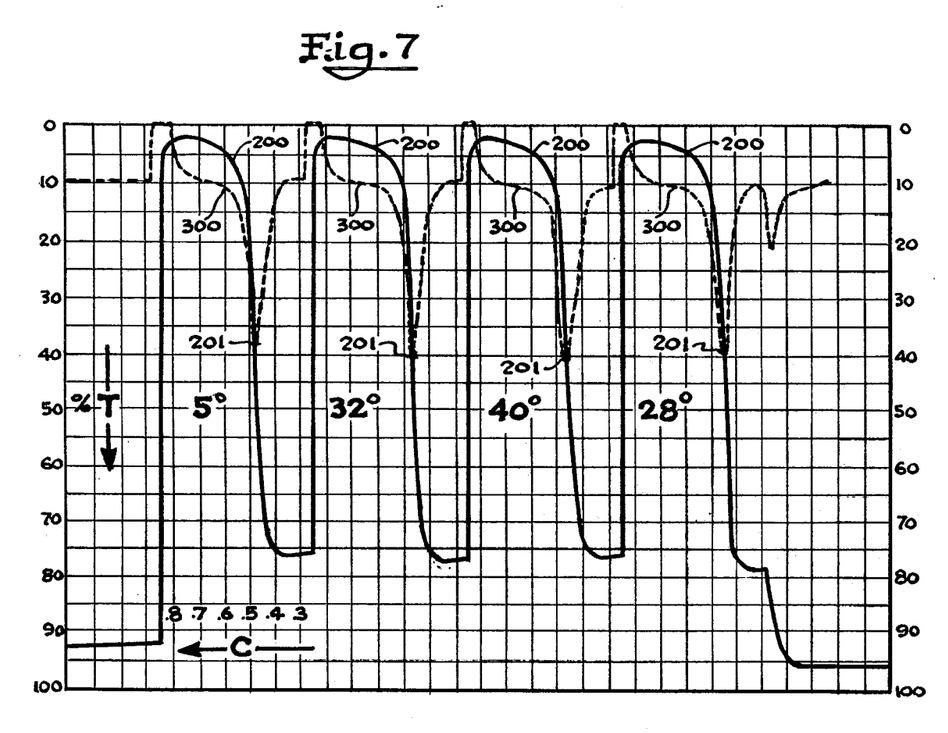
FIGURE 7 is a plot of four sets of curves obtained over a 35° C. temperature range.

Whereas the result of Danon's method, previously described, is largely temperature-dependent since the salt gradient is created by osmosis through a dialysis membrane and since the osmotic pressure is a function of temperature, the method herein described is affected very little by temperature variation. Referring to FIGURE 7, four sets of curves obtained by the method of the present invention over a 35° temperature range are illustrated. Examination of these curves shows that the inflection point 201 varies only 0.02% salt concentration from 5°–40° C. so that very little error will result from employment of the described method at or near room temperature.

Figure 8:
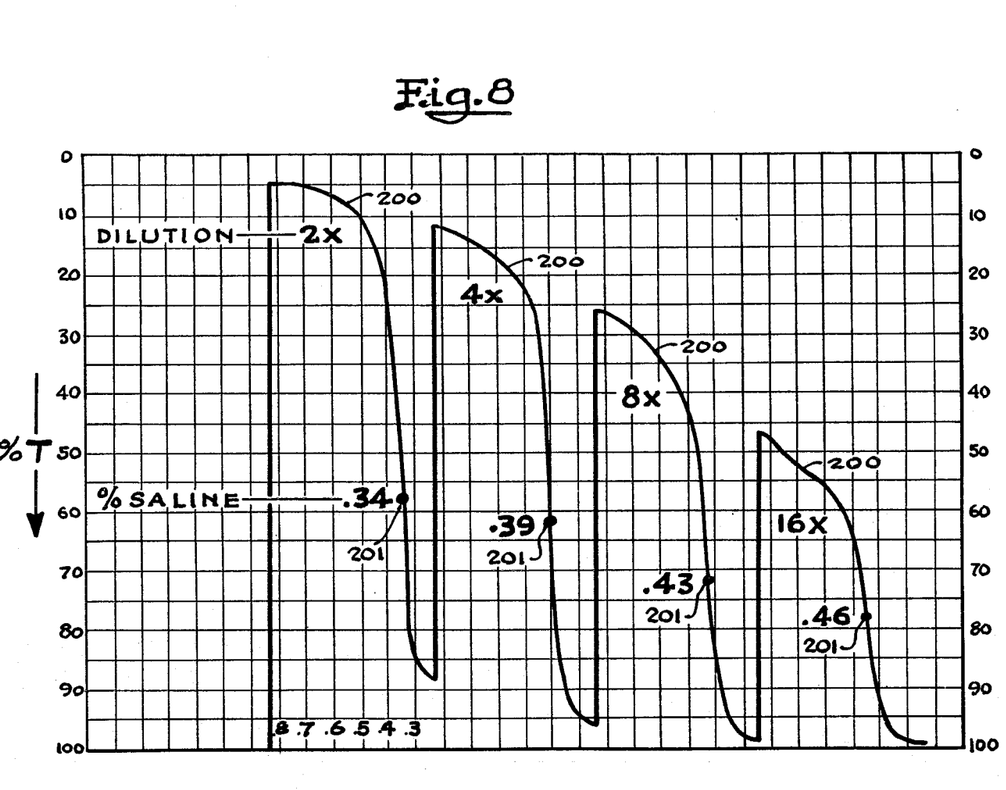
FIGURE 8 is a plot of four sets of curves obtained at different final concentrations of red blood cells.

Of greater concern in the employment of the described method is the dilution factor, i.e., the ratio of red blood cell concentration to the saline solution gradient. In the embodiment described, a blood dilution of 25:1 (0.10 ml. of blood added to 2.4 ml. of gradient) has been utilized. Referring to FIGURE 8, there are illustrated four curves obtained with blood diluted in various ratios from a twofold dilution to a 16-fold dilution. As can be seen, the inflection point 201 over this range of dilution moves up scale by 0.12% salt concentration, i.e., from 0.34% to 0.46% salt. Therefore, if it is desired to make a comparison of the maximum rate of hemolysis of various samples of blood cells, it is desirable that all measurements be made at one dilution factor.

What is claimed is:
1. A method for automatically determining the osmotic fragility of red blood cells, which method comprises:
   (a) providing a predetermined amount of an initial saline solution of preselected salt concentration;
   (b) continuously adding water to the saline solution to produce an admixture thereof while simultaneously withdrawing admixture to produce a saline solution gradient stream of continuously decreasing salt concentration;
   (c) simultaneously and continuously admixing a stream of red blood cells with the resultant saline solution gradient stream to produce a suspension of the red blood cells therein;
   (d) passing light through the suspension; and
   (e) measuring the light transmission through the suspension to determine the osmotic fragility of the red blood cells as a function of salt concentration.

2. The method of claim 1 in which the admixture of saline solution and water is withdrawn at twice the rate at which the water is added to the saline solution to produce a linear saline solution gradient stream of continuously decreasing salt concentration to which the red blood cells are simultaneously added.

3. The method of claim 2 in which the saline solution gradient stream has an initial salt concentration of from 0.7%–0.9% and a final salt concentration of from 0.0%–0.3%.

4. The method of claim 1 which includes the step of delaying the suspension of red blood cells in saline solution gradient to permit hemolysis to take place before passing light through said suspension.

5. The method of claim 1 which includes generating an electrical current signal responsive to the light transmission of the red blood cell suspensions, and recording the signal to produce a chart of the hemolysis of the red blood cells as a function of salt concentration.

6. The method of claim 1 which includes providing a plurality of blood samples, withdrawing unused saline solution gradient employed in the determination of the first of said samples, generating a fresh saline solution gradient stream, continuously admixing the second of said blood samples with the fresh saline solution gradient stream, determining the osmotic fragility of the second of said blood samples, and sequentially repeating said method until the osmotic fragility of the last of said samples has been determined.

7. Apparatus for preparing a solution of preselected concentration gradient from a first solution and a diluent comprising: a storage vessel for holding a predetermined amount of the first solution; a mixing vessel for mixing the first solution and diluent to prepare a gradient therefrom; a first conduit communicating with the storage vessel and mixing vessel; a first valve means disposed in the first conduit between the storage vessel and the mixing vessel to control the addition of the predetermined amount of solution to the mixing vessel; a second conduit communicating with the mixing vessel for adding the diluent thereto; a conduit communicating with the mixing vessel to withdraw gradient therefrom; a conduit communicating with the mixing vessel for withdrawing excess gradient solution; a second valve means disposed in the excess gradient withdrawing conduit; and timing means connected to each of the valve means and arranged to first open the second valve means to completely drain the mixing vessel of excess gradient and thereafter open the first valve means to fill the mixing vessel with the predetermined amount of first solution contained in the storage vessel; the relative sizes of the conduit for adding diluent to the mixing vessel and the conduit for withdrawing gradient therefrom being selected to provide preselected flow rates to thereby provide the desired concentration gradient.

8. The apparatus of claim 7 wherein the conduit for withdrawing gradient from the mixing vessel is selected to provide twice the flow rate of the conduit for adding diluent thereto to thereby provide apparatus for preparing a linear gradient.

References Cited

UNITED STATES PATENTS 3,300,385   1/1967   Danon.

RONALD L. WIBERT, Primary Examiner

O. B. CHEW II, Assistant Examiner

U.S. Cl. X.R.

250—218

PO-1050
(5/69)

UNITED STATES PATENT OFFICE
CERTIFICATE OF CORRECTION

Patent No. 3,502,412      Dated March 24, 1970

Inventor(s) Donald A. Burns

It is certified that error appears in the above-identified patent and that said Letters Patent are hereby corrected as shown below:

Column 1, line 48, "bp" should read "by";

Column 5, line 33, after "43 and" delete "monitoring the absorbance of the gradient being" and insert --and the recorder is adjusted to 100% transmission line 40, "any" should read "and".

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents